United States Patent [19]

Milesky et al.

[11] Patent Number: 5,245,292
[45] Date of Patent: Sep. 14, 1993

[54] METHOD AND APPARATUS FOR SENSING A FLUID HANDLING

[75] Inventors: Lawrence Milesky, Needham; David G. AbiChaker, West Roxbury, both of Mass.

[73] Assignee: Iniziative Marittime 1991, S.R.L., Turin, Italy

[21] Appl. No.: 949,748

[22] Filed: Sep. 23, 1992

Related U.S. Application Data

[63] Continuation of Ser. No. 536,505, Jun. 12, 1990, abandoned.

[51] Int. Cl.$^5$ .................... G01N 1/14; G01N 21/17
[52] U.S. Cl. .................... 324/639; 324/697; 324/71.4; 422/82; 422/106; 436/5; 436/150
[58] Field of Search ............ 324/629, 630, 639, 641, 324/647, 71.1, 71.4, 697, 663, 640; 73/304 R; 422/63, 82, 106; 436/150, 5; 250/900, 901, 577; 356/344

[56] References Cited

U.S. PATENT DOCUMENTS

| | | | |
|---|---|---|---|
| 3,265,873 | 8/1966 | Sawyer | 324/639 X |
| 3,286,163 | 11/1966 | Holser et al. | 324/338 |
| 4,107,993 | 8/1978 | Shuff et al. | 324/640 X |
| 4,873,875 | 10/1989 | Cork | 250/577 X |

*Primary Examiner*—Kenneth A. Wieder
*Assistant Examiner*—Jose M. Solis
*Attorney, Agent, or Firm*—Fish & Richardson

[57] ABSTRACT

Method and apparatus for sensing fluid interface(s) in a complex fluid such as centrifuged blood, includes a sensing assembly with a microwave source and a microwave sensor positioned in spaced opposed relation, the microwave source and sensor defining a microwave propagation path. Relative motion is induced between the sample container and the microwave energy propagation path in the region between the source and sensor in a direction that intersects and is essentially perpendicular to the microwave energy propagation path; and processor apparatus responsive to the scanning apparatus and the modification in microwave energy sensed by the microwave sensor provides an indication(s) of the location(s) of a fluid interface(s) in the container.

16 Claims, 1 Drawing Sheet

METHOD AND APPARATUS FOR SENSING A FLUID HANDLING

This is a continuation of application Ser. No. 07/536,505, filed Jun. 12, 1990, now abandoned.

This invention relates to fluid handling, and more particularly to methods and apparatus for sensing interface regions of complex fluid materials.

Individual samples of biological fluids such as blood are frequently stored and handled for processing in elongated tubular containers. Each biological fluid sample must be reliably identified for positive patient source identification and for processing, control and data handling purposes. Typically, a blood sample is manually drawn from a patent into a container and one or more labels are placed on the container for identification and control purposes. These labels differ in size and frequently are located randomly on the container. After a blood sample is stored in the container, it is frequently subjected to further processing such as centrifugation in which the blood sample is subjected to centrifugal force for separating the constituents of the blood sample into cellular and serum components. In further blood sample processing, accurate determination of the location of the air-serum interface and/or the cell serum interface is desirable. Labels on the container may interfere with and make automated use of optical techniques for determining the location of those interfaces difficult and unreliable.

In accordance with one aspect of the invention, there is provided apparatus for sensing fluid in a container that includes a sensing assembly with a microwave source and a microwave sensor positioned in spaced opposed relation, the microwave source and sensor defining a microwave propagation path; scanning apparatus for inducing relative motion between the sample container and the microwave energy propagation path in the region between the source and sensor in a direction that intersects and is essentially perpendicular to the microwave energy propagation path; and processor apparatus responsive to the scanning apparatus and the modification in microwave energy sensed by the microwave sensor for providing an indication(s) of the location(s) of a fluid interface(s) in the container. Preferably, the differential between microwave energy attenuated by a first fluid in said container and the microwave energy attenuated by a second fluid in said container is at least about ten percent.

In a particular embodiment, the system is used with elongated glass vacutainer that has a length of about ten centimeters, is about two centimeters in diameter and includes a seal member at one end of the vacutainer. The microwave source preferably operates at a frequency of at least ten gigahertz, and in the particular embodiment, the microwave source is a Gunn oscillator operating at twenty-four gigahertz. The scanning rate in that particular embodiment is one centimeter per second. The resulting microwave energy outputs are independent of paper or plastic label material on the elongated container and permit reliable indicia of the locations of air-serum and serum-cell interfaces in the complex fluid material in the container as a function of the longitudinal container length to be obtained. In a particular embodiment, energy attenuated by the glass tube alone is about fifty-five percent of unattenuated energy, energy attenuated by the serum component of a blood sample is about twenty percent of unattenuated energy and energy attenuated by the cellular component of a blood sample is about ten percent of unattenuated energy.

In accordance with another aspect of the invention, there is provided a method of sensing an interface between fluid constituents in a complex fluid sample that includes the steps of establishing a beam of microwave energy along a predetermined propagation path between a source and a sensor, disposing a sample container that contains a fluid sample with a fluid constituent interface adjacent the propagation path, inducing relative motion between the container and the beam of microwave energy along a path perpendicular to the propagation path so that microwave energy in the path is transmitted through the container, and measuring the microwave energy sensed by the sensor as a function of the longitudinal position of the container to provide an output indicative of the location of a fluid interface in the sample material in the container.

Other features and advantages of the invention will be seen as the following description of a particular embodiment progresses, in conjunction with the drawings, in which.

DESCRIPTION OF PARTICULAR EMBODIMENT

Figure 1:
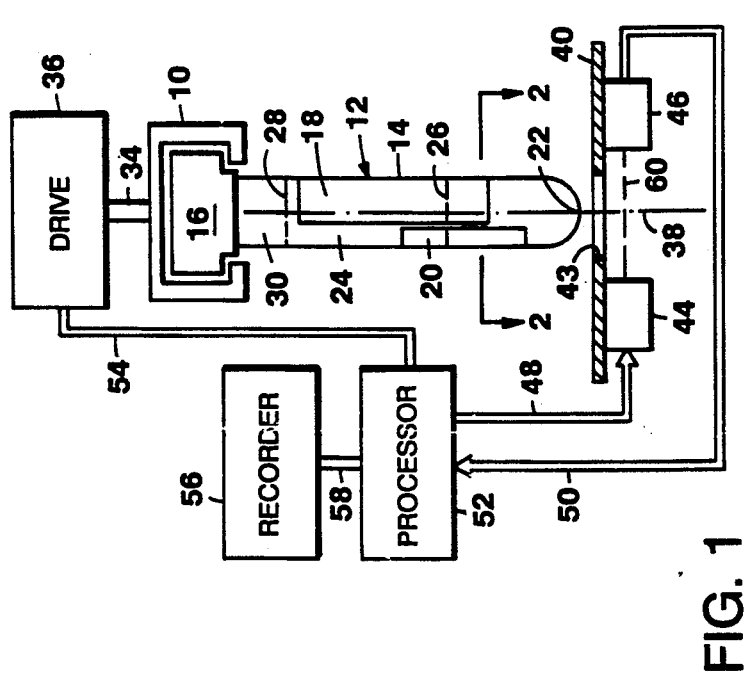
FIG. 1 is a schematic view of apparatus in accordance with the invention.
Figure 2:
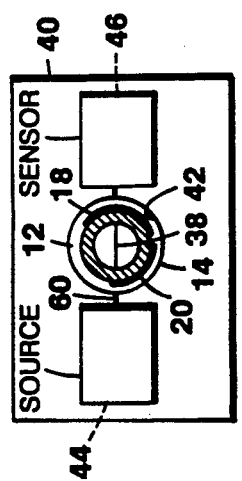
FIG. 2 is a diagrammatic plan view taken along the line 2—2 of FIG. 1.

With reference to FIG. 1, the apparatus includes a clevis type coupling diagrammatically indicated at 10 for supporting ten microliter Vacutainer 12 that has a diameter of about 1.6 centimeters and a length of about ten centimeters. Vacutainer 12 includes tubular glass tube 14 and seal cap 16. Container 12 is initially under vacuum, and a blood sample is drawn into container 12 through cap 16 by the vacuum. Labels 18, 20 are attached to container 12 to provide the patient (sample source) identification and process control information. A label may include for data processing bar code information, for example. The container and blood sample are then centrifuged, resulting in a cellular component (packed cells) (diagrammatically indicated at 22) in the lower part of the tube 14; a separated serum component 24 above the cellular component 22 with an interface 26 between the serum and cellular components; and the top of the serum component 24 provides a second interface 28 with air in the upper region 30 of the container.

Coupling 10 is connected by shaft 34 to drive 36 (which in a particular embodiment includes a stepper motor and a rack and pinion drive) for moving container 14 along a vertical path indicated by line 38.

Disposed along path 38 is yoke plate 40 which has aperture 42 and supports microwave source 44 (MA-86791 K-band Gunn oscillator) that operates at a frequency of 24.15 gigahertz and at 40 milliwatts power level and is about three centimeters in each dimension. Disposed on yoke disc 40 on the opposite side of aperture 42 from source 44 is K-band microwave sensor 46 (MA-86561 Schottky detector diode that has a minimum bandwidth of about 300 megahertz). Source 44 and sensor 46 are connected by cables 48, 50 respectively, to processor 52 which is also connected by cable 54 to drive 36. An output device in the form of strip chart recorder 56 is connected to processor 52 by cable 58.

In system operation, Vacutainer 12 is attached to coupling 10 and processor 52 energizes source 44 to establish a microwave beam along path 60 that is transverse to and intersects axis 38 for sensing by sensor 46. Processor 52 then actuates drive 36 to move Vacutainer 12 at a velocity of one centimeter per second along axis 38. The microwave energy sensed by sensor 46 is coupled to processor 52 and processed for application to output device 56.

Figure 3:
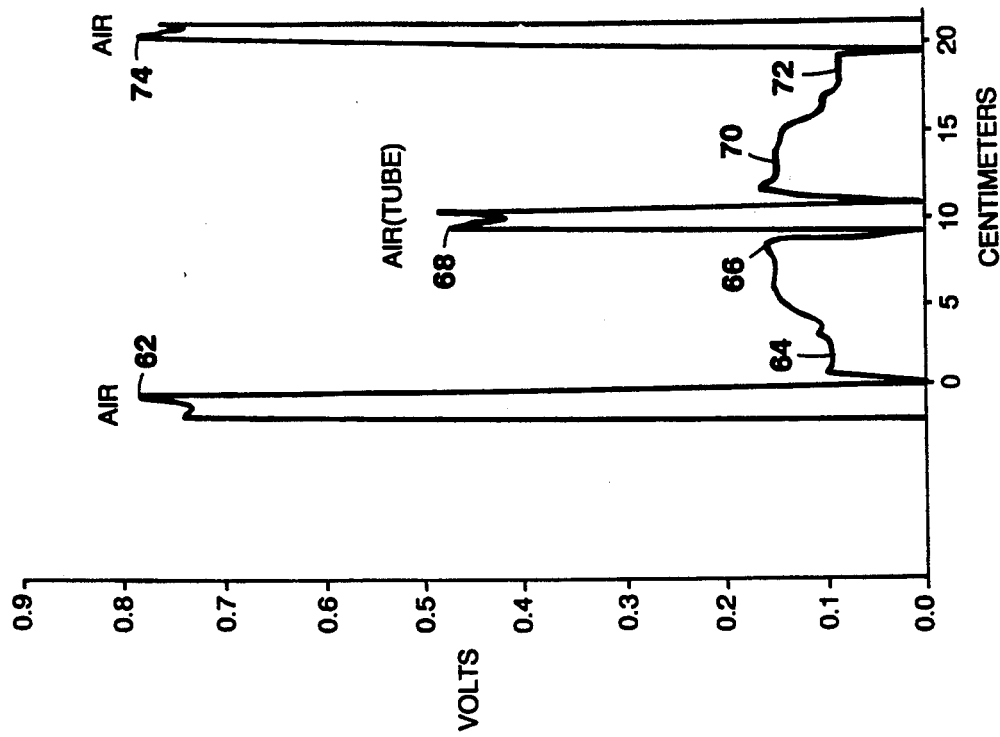
FIG. 3 is a graph of on measurements a container of centrifuged blood in accordance with the invention.

A graph of resulting process information voltage as a function of distance is shown in FIG. 3. In that plot, peak 62 is the unattenuated microwave beam energy and has a value of about 0.75 volt; region 64 is the microwave energy level as attenuated by the cellular component 22 and has a magnitude of about 0.1 volt; region 66 is the microwave energy level as attenuated by the serum component 24 and has a magnitude of about 0.15 volt; region 68 is the attenuated microwave energy level in the region above interface 28 and has a magnitude of about 0.45 volt; region 70 is the microwave energy level (about 0.15 volt) in the serum region 24 as drive 38 is moving vacutainer 12 in the reverse direction; region 72 is the attenuated microwave energy level (slightly less than 0.1 volt) in cell region 22; and peak 74 is the sensor output voltage when controller 36 has raised vacutainer 12 out of the beam path 60 and is about 0.75 volt.

As can be see from the output chart of FIG. 3, the cell-serum interface 26 is indicated at the transition between regions 64 and 66 and between regions 70 and 72; and the location of the serum-air interface 28 is indicated by the transitions between regions 66 and 68 and between regions 68 and 70. In this example, the cell-serum interface 26 is located about four centimeters above the lower end of vacutainer 12 and the serum-air interface 28 is located about eight centimeters above the lower end of Vacutainer 12. The system thus provides indications of the locations of cell-serum and serum-air interfaces in the container 12 for information and control in subsequent processing and analysis of the blood sample.

While a particular embodiment of the invention has been shown and described, various modifications will be apparent to those skilled in the art, and therefore it is not intended that the invention be limited to the disclosed embodiment or to details thereof, and departures may be made therefrom within the spirit and scope of the invention.

What is claimed is:

1. A method of determining the location of a serum-cell interface in a sample of centrifuged blood disposed in a container of the kind that may include material disposed thereon that substantially attenuates energy within a predetermined frequency range, said method comprising
providing a microwave source and a microwave sensor in spaced relation on opposite sides of a scanning axis to define a microwave energy propagation path essentially perpendicular to said scanning axis, said microwave source having an operating frequency outside of said predetermined frequency range so that said microwave energy is substantially unattenuated by said material;
producing relative motion between said container of centrifuged blood and said microwave assembly along said scanning axis so that microwave energy in said propagation path is transmitted through said container regardless of whether said container is oriented so that said material intersects said path during said relative movement; and
causing said sensor to sense microwave energy from said source as attenuated by said container and blood to provide an indication of the location of a cell-serum interface in the sample of centrifuged blood in said container.

2. The method of claim 1 wherein said relative motion is induced at a rate of at least about one-half centimeter per second.

3. The method of claim 1 wherein said microwave source and sensor are supported in fixed position, and said container is moved in an essentially vertical direction relative to said microwave source and sensor along said scanning axis.

4. The method of claim 1 wherein the differential between microwave energy attenuated by said serum in said container and the microwave energy attenuated by said cellular component in said container is at least about ten percent of unattenuated microwave energy sensed by said sensor.

5. The method of claim 4 wherein said container is of elongated tubular configuration and has a length at least four times its width dimension, said microwave source has an operating frequency in excess of about ten gigahertz, and said relative motion is induced at a rate of at least about one-half centimeter per second.

6. The method of claim 5 wherein energy attenuated by said container alone is about fifty-five percent of unattenuated microwave energy, energy attenuated by the serum component of said blood sample is about twenty percent of unattenuated microwave energy and energy attenuated by the cellular component of said blood sample is about ten percent of unattenuated microwave energy.

7. A method of sensing an interface between fluid constituents in a complex fluid disposed in a container of the kind that may include material disposed thereon that substantially attenuates energy within a predetermined frequency range, said method comprising the steps of
establishing a beam of microwave energy along a predetermined propagation path between a microwave source that has an operating frequency outside of said frequency range so that said microwave energy is substantially unattenuated by said material and a sensor,
disposing said container adjacent said propagation path,
inducing relative motion between said container and said beam of microwave energy at a rate of at least about one-half centimeter per second along a movement path perpendicular to said propagation path so that microwave energy in said propagation path is transmitted through said container regardless of whether said container is oriented so that said material intersects said path during said relative movement, and
measuring the microwave energy sensed by said sensor as a function of the longitudinal position of said container in said movement path to provide an output indicative of the location of a fluid interface in the fluid material in said container.

8. The method of claim 7 wherein the differential between microwave energy attenuated by a first fluid in said container and the microwave energy attenuated by a second fluid in said container is at least about ten percent of microwave energy unattenuated by said container.

9. The method of claim 7 wherein said material includes at least one label that serves to identify said container.

10. The method of claim 9 wherein said label substantially attenuates optical energy within said predetermined frequency range.

11. The method of claim 7 wherein said operating frequency is approximately twenty-four gigahertz.

12. Apparatus for sensing a fluid interface in a container of the kind that may include material disposed thereon that substantially attenuates energy within a predetermined frequency range, said container having an elongated tubular configuration that has a length at least four times its width dimension, said apparatus comprising sensing apparatus comprising a microwave source that has an operating frequency outside of said frequency range so that microwave energy produced by said source is substantially unattenuated by said material, and a microwave sensor in spaced relation from said source and defining a microwave energy propagation path therebetween;

scanning apparatus for inducing relative movement at a rate of at least about one-half centimeter per second between a container to be sensed and said sensing apparatus in a direction essentially perpendicular to and intersecting said microwave energy propagation path; and processor apparatus for energizing said sensing apparatus and said scanning apparatus in coordinated manner to sense the attenuation of the microwave energy is said propagation path as a function of the position of said container in said path regardless of whether said container is oriented so that said material intersects said path during said relative movement to provide an indication of the location of an interface between components of a complex fluid material in said container.

13. The apparatus of claim 12 wherein said apparatus is adapted to sense an interference between fluid constituents in a complex fluid, the differential between microwave energy attenuated by a first fluid in said container and the microwave energy attenuated by a second fluid in said container is at least about ten percent of unattenuated microwave energy is said propagation path.

14. The apparatus of claim 12 wherein said material includes at least one label that serves to identify said container.

15. The apparatus of claim 14 wherein said label substantially attenuates optical energy within said predetermined frequency range.

16. The apparatus of claim 12 wherein said operating frequency is approximately twenty-four gigahertz.

* * * * *